US009430095B2

(12) United States Patent
Pradeep et al.

(10) Patent No.: US 9,430,095 B2
(45) Date of Patent: Aug. 30, 2016

(54) GLOBAL AND LOCAL LIGHT DETECTION IN OPTICAL SENSOR SYSTEMS

(71) Applicant: Microsoft Technology Licensing, LLC, Redmond, WA (US)

(72) Inventors: Vivek Pradeep, Snohomish, WA (US); Liang Wang, Sammamish, WA (US); Pablo Sala, Bothell, WA (US); Luis Eduardo Cabrera-Cordon, Bothell, WA (US); Steven Nabil Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/162,440

(22) Filed: Jan. 23, 2014

(65) Prior Publication Data
US 2015/0205445 A1 Jul. 23, 2015

(51) Int. Cl.
*G06F 3/042* (2006.01)
*G06K 9/46* (2006.01)
*G06F 3/041* (2006.01)

(52) U.S. Cl.
CPC ............ *G06F 3/0425* (2013.01); *G06F 3/042* (2013.01); *G06F 3/0416* (2013.01); *G06K 9/4642* (2013.01)

(58) Field of Classification Search
CPC ............... G06F 3/042–3/0428; G06F 3/0416; G06K 9/4642
USPC ............................ 345/175; 178/18.09, 18.11
See application file for complete search history.

(56) References Cited

U.S. PATENT DOCUMENTS

| 6,556,210 B1 * | 4/2003 | Yamamoto ............ G06T 11/001 345/418 |
| 8,466,902 B2 | 6/2013 | Boer et al. |
| 8,786,576 B2 | 7/2014 | Jung et al. |
| 9,329,727 B2 | 5/2016 | Wang et al. |
| 2006/0044282 A1 | 3/2006 | Pinhanez et al. |
| 2008/0244468 A1 | 10/2008 | Nishihara et al. |
| 2010/0201275 A1 | 8/2010 | Cok et al. |
| 2011/0080490 A1 | 4/2011 | Clarkson et al. |
| 2011/0122071 A1 | 5/2011 | Powell |

(Continued)

FOREIGN PATENT DOCUMENTS

| EP | 1755022 | 2/2007 |
| WO | WO-2012145496 | 10/2012 |
| WO | WO-2013130920 | 9/2013 |

OTHER PUBLICATIONS

"International Search Report and Written Opinion", Application No. PCT/US2014/068249, Mar. 16, 2015, 18 Pages.

(Continued)

*Primary Examiner* — Stephen Sherman
(74) *Attorney, Agent, or Firm* — Brandon Roper; Judy Yee; Micky Minhas

(57) ABSTRACT

Global and local light detection techniques in optical sensor systems are described. In one or more implementations, a global lighting value is generated that describes a global lighting level for a plurality of optical sensors based on a plurality of inputs received from the plurality of optical sensors. An illumination map is generated that describes local lighting conditions of respective ones of the plurality of optical sensors based on the plurality of inputs received from the plurality of optical sensors. Object detection is performed using an image captured using the plurality of optical sensors along with the global lighting value and the illumination map.

20 Claims, 13 Drawing Sheets

(56) References Cited

U.S. PATENT DOCUMENTS

| | | | |
|---|---|---|---|
| 2012/0057040 A1* | 3/2012 | Park et al. | 348/222.1 |
| 2012/0113142 A1* | 5/2012 | Adhikari et al. | 345/633 |
| 2012/0127128 A1 | 5/2012 | Large et al. | |
| 2012/0200532 A1 | 8/2012 | Powell et al. | |
| 2012/0319977 A1 | 12/2012 | Kuge | |
| 2013/0127704 A1 | 5/2013 | Jung et al. | |
| 2013/0156297 A1 | 6/2013 | Shotton et al. | |
| 2013/0201155 A1 | 8/2013 | Wu et al. | |
| 2013/0207937 A1 | 8/2013 | Lutian et al. | |
| 2013/0229357 A1 | 9/2013 | Powell | |
| 2013/0241887 A1 | 9/2013 | Sharma | |
| 2014/0035805 A1 | 2/2014 | Minnen et al. | |
| 2015/0160785 A1 | 6/2015 | Wang et al. | |

OTHER PUBLICATIONS

"International Search Report and Written Opinion", Application No. PCT/US2015/012328, May 11, 2015, 9 Pages.

Ahsanullah, "Investigation of Fingertip Blobs on Optical Multi-Touch Screen System", In International Symposium in Information Technology, vol. 1, Jun. 15, 2010, 6 pages.

Ewerling, "A Novel Processing Pipeline for Optical Multi-Touch Surfaces System", Available at <http://arxiv.org/pdf/1301.1551.pdf>, MSc Thesis, Feb. 29, 2012, 86 pages.

Hodges, et al., "ThinSight: Versatile Multi-touch Sensing for Thin Form-factor Displays", In Proceedings of UIST 2007, Available at <http://citeseerx.ist.psu.edu/viewdoc/download?doi=10.1.1.137.2342&rep=rep1&type=pdf>, Oct. 10, 2007, 10 pages.

Soni, et al., "An Interactive Infrared Sensor Based Multi-Touch Panel System", In International Journal of Scientific and Research Publications, vol. 3, Issue 3, Mar. 2013, 12 pages.

Wilson, "TouchLight: An Imaging Touch Screen and Display for Gesture-Based Interaction", In Proceedings of ICIM 2004, Available at <http://citeseerx.ist.psu.edu/viewdoc/download?doi=10.1.1.95.3647&rep=rep1&type=pdf>, Oct. 2004, 8 pages.

Yang, et al., "An Effective Robust Fingertip Detection Method for Finger Writing Character Recognition System", In Proceedings of the Fourth International Conference on Machine Learning and Cybernetics, vol. 8, Aug. 18, 2005, 6 pages.

"Notice of Allowance", U.S. Appl. No. 14/103,499, Jan. 4, 2016, 5 pages.

"Second Written Opinion", Application No. PCT/US2015/012328, Dec. 23, 2015, 5 Pages.

"Non-Final Office Action", U.S. Appl. No. 14/103,499, Sep. 10, 2015, 12 pages.

"International Preliminary Report on Patentability", Application No. PCT/US2015/012328, Mar. 31, 2016, 6 pages.

\* cited by examiner

200

GLOBAL AND LOCAL LIGHT DETECTION IN OPTICAL SENSOR SYSTEMS

BACKGROUND

Computing devices may be configured to include touch functionality to detect proximity of an object to initiate one or more actions. For example, touch functionality may be utilized to detect proximity of a finger of a user's hand or other object to a display device as part of recognition of a gesture to initiate one or more functions of the computing device.

A variety of different types of sensors may be utilized to detect this proximity, one example of which includes use of optical sensors. The effectiveness of optical sensors are often sensitive to the environmental lighting conditions under which they operate. Accordingly, conventional use of the optical sensors in such environments could fail, thereby diminishing a user's experience and usefulness of the computing device as a whole, especially in situations in which the touch functionality is configured as a primary input technique for use with the computing device.

SUMMARY

Global and local light detection techniques in optical sensor systems are described. In one or more implementations, a global lighting value is generated that describes a global lighting level for a plurality of optical sensors based on a plurality of inputs received from the plurality of optical sensors. An illumination map is generated that describes local lighting conditions of respective ones of the plurality of optical sensors based on the plurality of inputs received from the plurality of optical sensors. Object detection is performed using an image captured using the plurality of optical sensors along with the global lighting value and the illumination map.

In one or more implementations, a system includes a plurality of optical sensors and modules implemented at least partially in hardware. The modules are configured to implement a global lighting module, a local lighting module, and an object detection module. The global lighting module is configured to generate a global lighting value that describes a global lighting level for the plurality of optical sensors based on a plurality of inputs received from the plurality of optical sensors. The local lighting module is configured to generate an illumination map that describes local lighting conditions of respective ones of the plurality of optical sensors based on the plurality of inputs received from the plurality of optical sensors. The object detection module configured to perform object detection using an image captured using the plurality of optical sensors along with the global lighting value and the illumination map.

In one or more implementations, a plurality of pre-trained class histograms are trained that are usable to detect a global lighting value through comparison with a histogram generated from inputs received from a plurality of optical sensors of an optical sensor system. The training includes generating a plurality of histograms, each representing intensity of pixels in respective one of the plurality of training images. The training also includes classifying training images into a respective one of a plurality of classes through comparison of the histograms generated from respective ones of the plurality of training images with histograms generated from seed images that are representative of the classes, each of the classes representative of a respective global lighting value. The training further includes updating the histograms that are representative of the classes based on the classifying to form the plurality of pre-trained class histograms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accuracy in the conventional use of optical sensors for object detection is often sensitive to lighting conditions of an environment in which the optical sensors are placed. For example, ambient lighting conditions may have an effect on a device's ability distinguish an object (e.g., a fingertip of a user's hand) from the device's surroundings.

Global and local light detection techniques for optical sensor systems are described. Optical sensors may be configured in a variety of ways to detect proximity of an object, such as incorporated in a sensor-in-pixel design as part of a display device. Images collected from the sensors may then be processed to detect whether an object is proximal to respective ones of the sensors. A variety of different techniques may be employed to perform this processing. As previously described, however, an amount of ambient light may have an adverse effect on detection objects.

Accordingly, techniques are described that may be utilized to detect an amount of light both globally and locally of an optical sensor system. The optical sensor system, for instance, may be configured to detect global lighting conditions that apply to the optical sensor system, generally, as a whole. The optical sensor system may also be configured to detect local lighting conditions that are spatially localized for portions of the optical sensor system. The techniques may be applied in parallel and used to determine light effects at a per pixel level. Further discussion of these and other techniques may be found in relation to the following sections.

In the following discussion, an example environment is first described that is operable to employ the global and local light detection techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
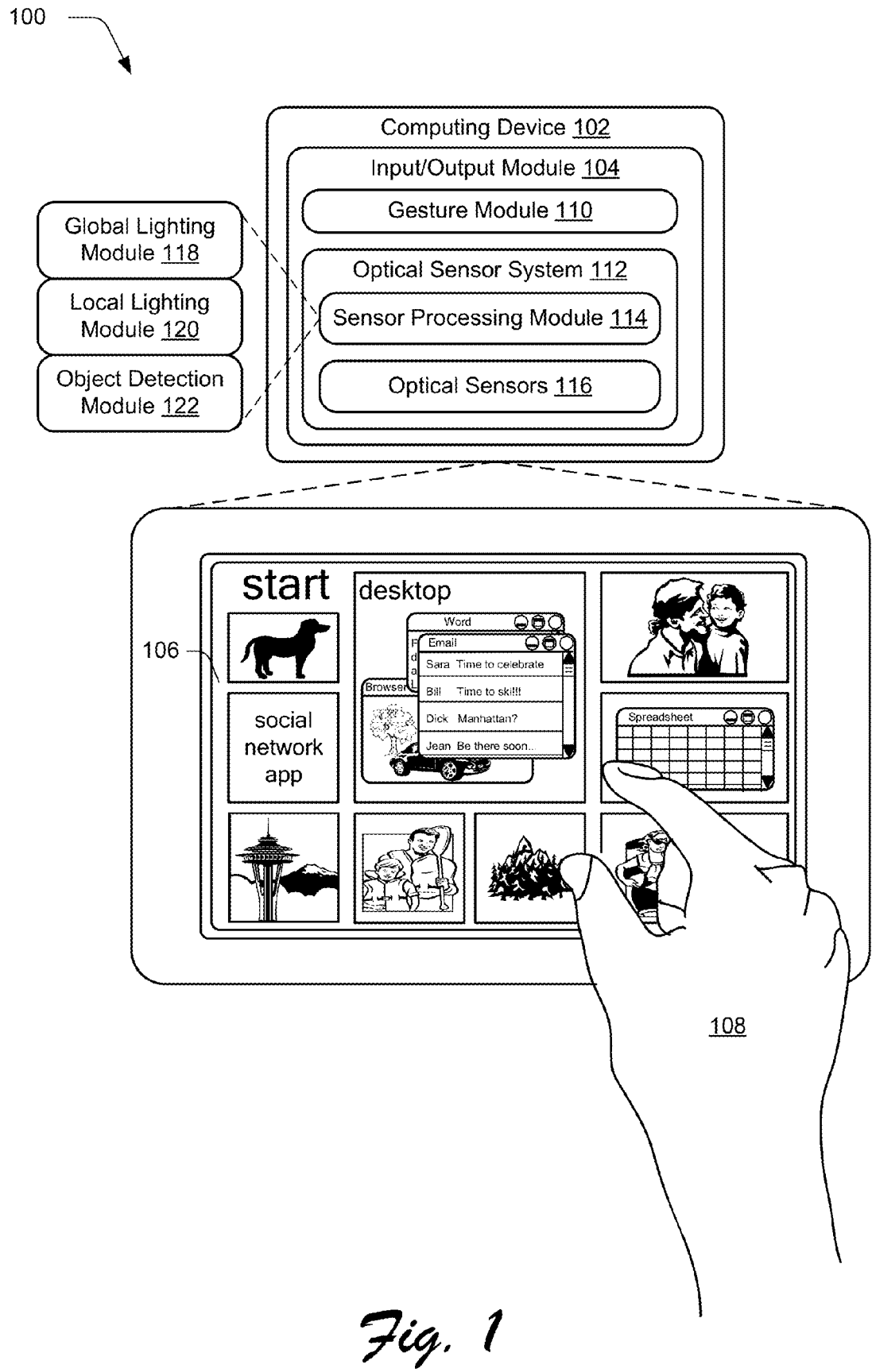
FIG. 1 is an illustration of an environment in an example implementation that is operable to employ object detection techniques for use in optical sensor systems.

FIG. 1 is an illustration of an environment 100 in an example implementation that is operable to employ object detection techniques for use in optical sensor systems. The illustrated environment 100 includes an example of a computing device 102 that may be configured in a variety of ways. For example, the computing device 102 may be configured as a traditional computer (e.g., a desktop personal computer, and so on), a mobile communications device (e.g., a tablet as illustrated, a mobile phone, portable game device, portable music device, or other mobile configuration configured to be held by one or more hands of a user), an entertainment appliance, a set-top box communicatively coupled to a television, a wireless phone, a netbook, a game console, and so forth as further described in relation to FIG. 13. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations as well as refer to a combination of devices, e.g., a gesture capture device and game console, set-top box and remote control, and so on.

The computing device 102 is illustrated as including an input/output module 104. The input/output module 104 is representative of functionality relating to inputs of the computing device 102. For example, the input/output module 104 may be configured to receive inputs from a keyboard, mouse, to identify gestures and cause operations to be performed that correspond to the gestures, and so on. The inputs may be identified by the input/output module 104 in a variety of different ways.

For example, the input/output module 104 may be configured to recognize an input received via touchscreen functionality of a display device 106 to detect an object as proximal to the display device 106, such as a finger of a user's hand 108 as proximal to the display device 106 of the computing device 102, from a stylus, and so on. The input may take a variety of different forms, such as to recognize movement of a finger of the user's hand 108 across the display device 106, such as a tap, drawing of a line, and so on.

In implementations, these inputs may be recognized as gestures by a gesture module 110. A variety of different types of gestures may be recognized by the gesture module 110, such as gestures that are recognized from a single type of input (e.g., touch gestures) as well as gestures involving multiple types of inputs. For example, the computing device 102 may be configured to detect and differentiate between inputs based on which object is utilized to perform the gesture, e.g., a stylus or finger as described above. Additionally, although a touch input is described the recognition of the object as proximal to the display device 106 may be made without contacts the display device 106, e.g., as a "hover."

Additionally, although the following discussion may describe specific examples of inputs, in instances the types of inputs may be switched (e.g., touch may be used to replace stylus, a hover may be used in place of physical contact, and so forth) without departing from the spirit and scope thereof. Further, although in instances in the following discussion the gestures are illustrated as being input using touchscreen functionality, the gestures may be input using a variety of different techniques by a variety of different devices to detect proximity of an object.

One such example that may be utilized to detect proximity of an object is displayed as an optical sensor system 112. The optical sensor system 112 includes a sensor processing module 114 that is representative of functionality to make a determination for each of the optical sensors 116 as to whether an object is disposed proximal to the sensors.

The optical sensors 116, for instance, may be configured as part of the display device 106 as an array of sensors embedded with corresponding pixels to detect proximity of objects as a sensor-in-pixel (SIP) panel. For example, the optical sensors 116 may be configured as infrared sensors configured to detect infrared (IR) light to support an optical mode of interaction with the computing device 102. The optical sensors 116 in this IR configuration are embedded in the display device 106 to capture IR images of the surroundings of the display device 106 and even the computing device 102 as a whole, especially when objects are in contact with the display device, e.g., a user touches the screen.

Object detection by the optical sensors 116 and subsequent processing by the sensor processing module 114 allows the optical sensor system 112 to map object position and motion into actions that may be recognized as gestures by the gesture module 110 and/or support other interaction, such as object identification and so on. For example, machine learning techniques may be utilized to identify fingers from non-fingers, identify which finger of a user's hand is in use, and so on. A variety of different machine learning techniques may be employed, such as to leverage a histogram to classify touches although other examples are also contemplated without departing from the spirit and scope thereof.

Figure 2:
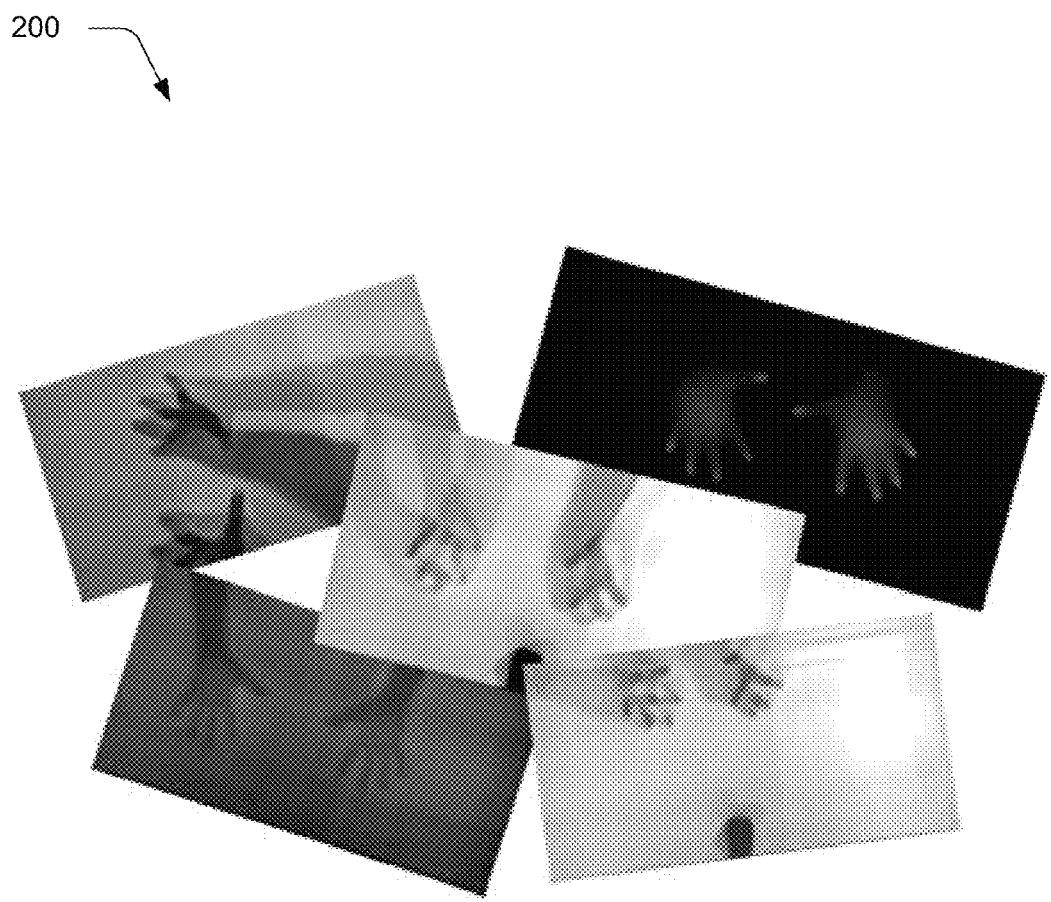
FIG. 2 illustrates an example showing images captured using the optical sensors of FIG. 1.

Conventional touch detection approaches assume that the infrared (IR) light is reflected back by fingers and forms a relatively bright spot in the SIP image captured by the sensors, with the background (non-finger region) being relatively dark. Therefore, these conventional approaches are based on local extrema in an intensity landscape captured by the sensors. In practice, however, the IR image may be dependent on the ambient lighting condition in the environment, such as directional lighting (light emanating from an overhead lighting fixture, spotlight or floodlight) or diffuse lighting such as light diffusely reflecting off a painted ceiling or emanating from clouds through large area of windows, and so on. As shown in the example 200 of FIG. 2, the background can be bright and there may be shadows cast by the hand.

There are different types of images that may be directly read from the optical sensors 116. For example, a first type may involve an image with both IR light and ambient light. A second type is an image that includes solely ambient light. These two types of images are denoted using "Field_0" and "Field_1", respectively, in the following.

Figure 3:
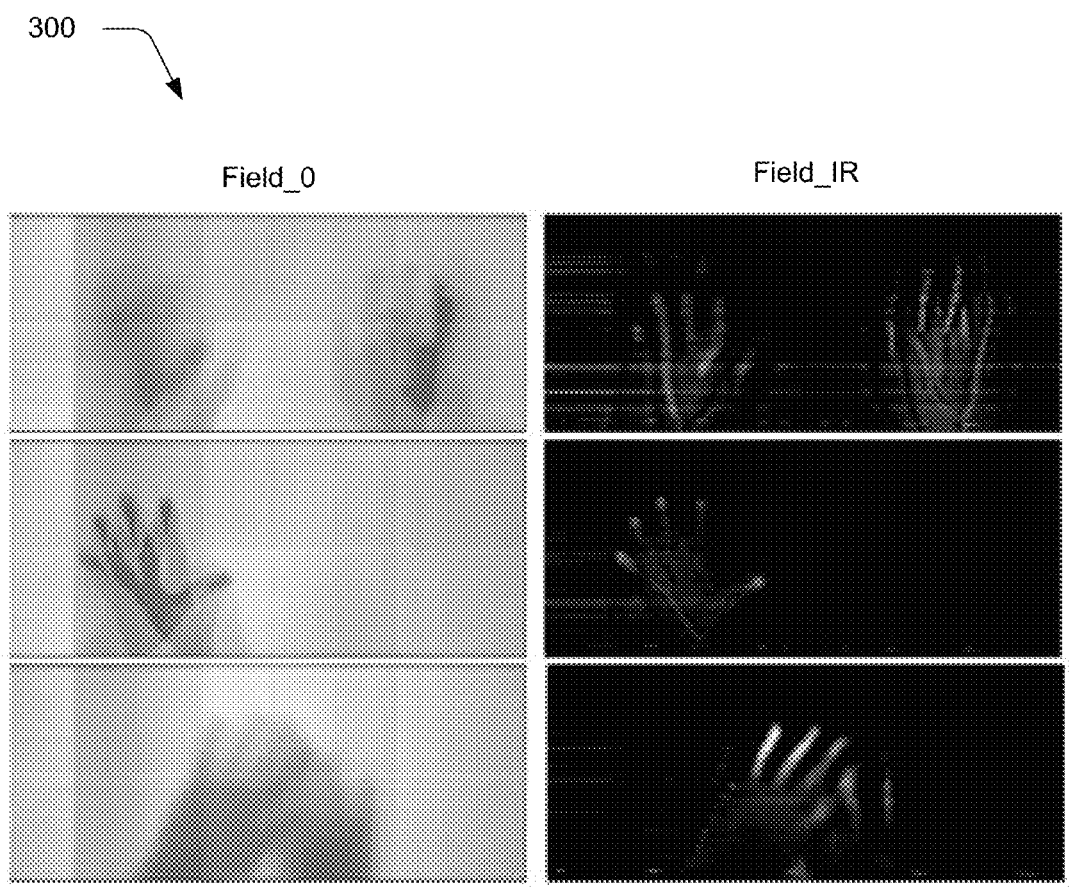
FIG. 3 illustrates an example showing images captured using the optical sensors of FIG. 1 and processed using a local extrema based approach.

In theory, subtraction of Field_1 from Field_0 may be performed to generate an IR component, which may be denoted as Field_IR in the rest of this discussion. This Field_IR image is, in theory, expected to be invariant to ambient lighting conditions. However, there are practical issues with this ambient cancelation technique. First of all, Field_0 and Field_1 are not taken at the same time. Therefore when an object moves, pixels near object boundaries could be bright in Field_IR which makes traditional local extrema based approach fail as shown in the example 300 shown in FIG. 3.

Second, the measured Field_0 and Field_1 images may be noisy both spatially and temporally. Such noises are content dependent and hence may be difficult to remove by conventional filtering methods. Further, pixel intensity values are not linear with respect to the sensor integration time and therefore ambient cancelation is not straightforward. Accordingly, motion artifacts, sensor noise, and optical sensor's nonlinear response make blob detection on Field_IR unreliable and lead to poor detection accuracy which is also shown in the example 300 of FIG. 3.

In the illustrated example, the sensor processing module 114 is illustrated as including a global lighting module 118, a local lighting module 120 and an object detection module 122. The global and local lighting modules 118, 120 may be utilized in parallel to estimate the amount of light in the environment at a global and local level (e.g., spatially-localized lighting), respectively.

The global lighting module 118, for instance, is representative of functionality to determine a global lighting level for an environment, in which, the optical sensor system 112 has been placed. For example, the global lighting module 118 may be configured to arrive at a global lighting value that generalizes an amount of light detected by the optical sensor system 112, generally, as a whole. The global lighting value, for instance, may be configured as a single value that gives a measure of a light level across the optical sensors 116 and thus whether the optical sensor system 112 is likely disposed in a dark, bright, or a mid-range lighted environment. In this example, the global lighting value calculated by the global lighting module 118 may be calculated without use of dedicated hardware (e.g., a light sensor) although other examples are also contemplated, such as to leverage use of a camera of the computing device 102.

The local lighting module 120 is representative of functionality to determine lighting conditions of portions that are a subset of an entirety of the optical sensors 116 of the optical sensor system 112, i.e., local lighting conditions. For example, the local lighting module 120 may be configured to detect different amounts of ambient and other light that are detectable by the optical sensors 116, such as a first subset of the optical sensors 116 begin exposed to light from a lamp while another subset is shaded by a hand 108 of a user.

By estimating the amount of light at a fine level (e.g., at a per-pixel level in a SIP implementation) similar techniques may be implemented with different parameters in different regions of an image captured by the optical sensors 116 to perform object detection by the object detection module 122. For example, the values calculated by the local lighting module 120 for different regions of the optical sensors 116 in the display device 106 may be used to "correct" the ambient lighting conditions for object detection and subsequent gesture recognition by the gesture module 110 at these regions.

In the following discussion, global lighting condition estimation techniques are first described, which include training of histograms and subsequent use of the histograms to perform global light detection. Local lighting condition estimation techniques are then described, which may be performed in parallel with the global lighting techniques and which may be used to support a variety of functionality, such as object detection and gesture recognition.

Global Light Detection Training Phase

Figure 4:
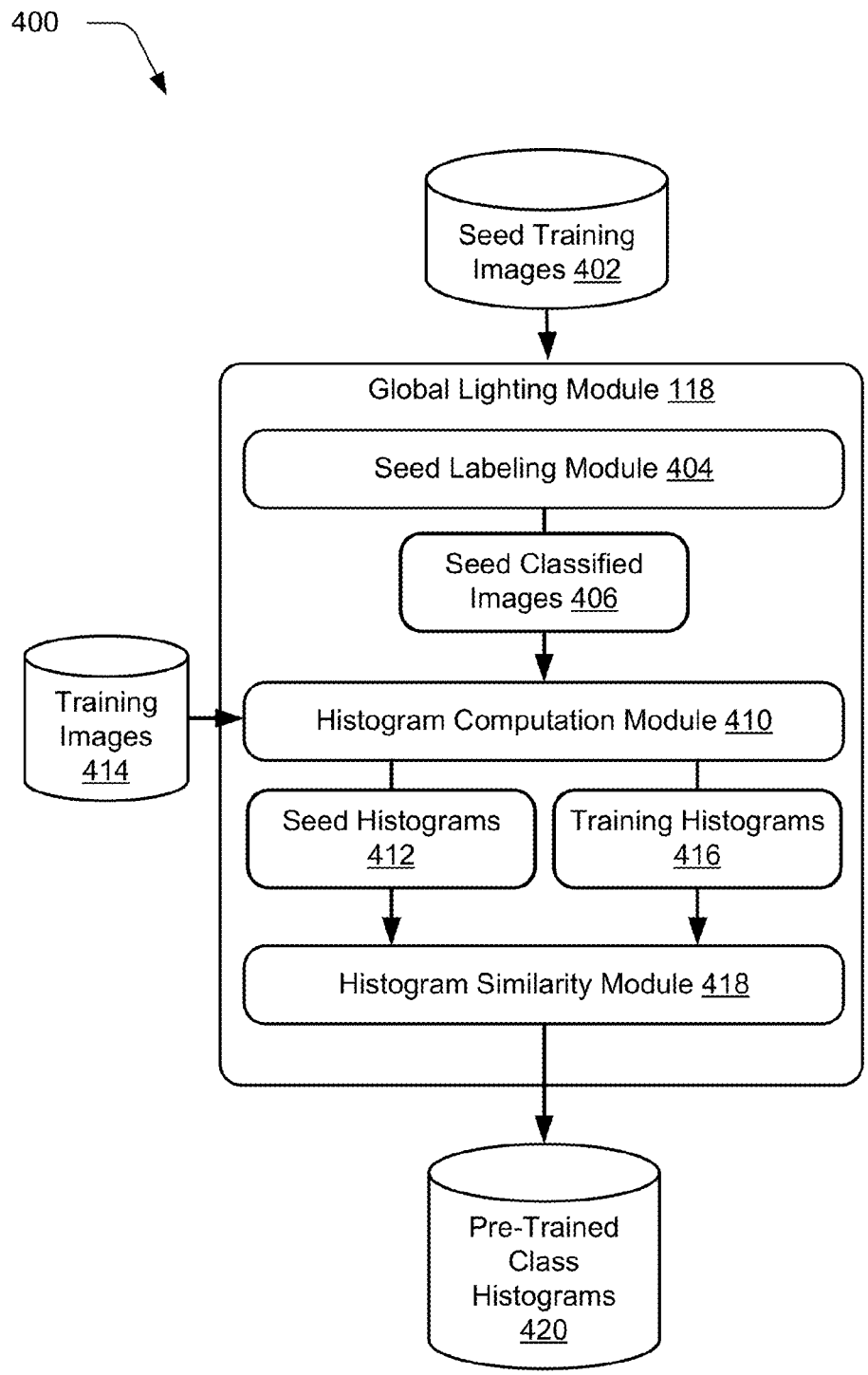
FIG. 4 depicts a system in an example implementation showing the global lighting module 118 of FIG. 1 in greater detail as performing a training phase.

FIG. 4 depicts a system 400 in an example implementation showing the global lighting module 118 of FIG. 1 in greater detail as performing a training phase. First, seed training images 402 are divided into "K" classes by a labeling module 404 to obtain seed classified images 406, where "K" is a user-specified parameter based on ambient light intensity. For example, users may interact with a user interface output by the seed labeling module 404 to manually select seed training images 402 for each class. In another example, a known lighting condition may be used, e.g., information recording during image capture by the optical sensor system 112 such as a number of light sources in a room, to automatically generate the seed classified images 406 automatically and without user intervention by the labeling module 404 to obtain the seed classified images 406.

A histogram computation module 410 may then be utilized to compute seed histograms 412 for each of the seed classified images 406 obtained from the seed labeling module 404 above. Thus, each of the seed histograms 412 computed for the seed classified images 406 may be representative of a corresponding one of a plurality of classes that were specified above.

The global lighting module 118 may then utilize classification techniques (e.g., a K-mean based clustering technique) to cluster training images 414 into respective ones of the plurality of classes. For example, the histogram computation module 410 may also be utilized to compute training histograms 416 for each of the training images 414.

A histogram similarity module 418 may then be utilized to assign each of the training images 414 to a respective one of the plurality of classes, e.g., a respective class ID, based on the respective training histograms 416. For example, the histogram similarity module 418 may employ a K-mean based classification technique to divide the training images 414 to respective classes by the training histograms. Thus, for each seed training image 402 (Field_0), the seed histogram 412 describing relative intensity of pixel values is computed. Then for each training image 414 a training histogram is computed and compared to one or more of the seed histograms 412. A nearest neighbor seed image's class ID is then assigned to that training image 414.

Figure 5:
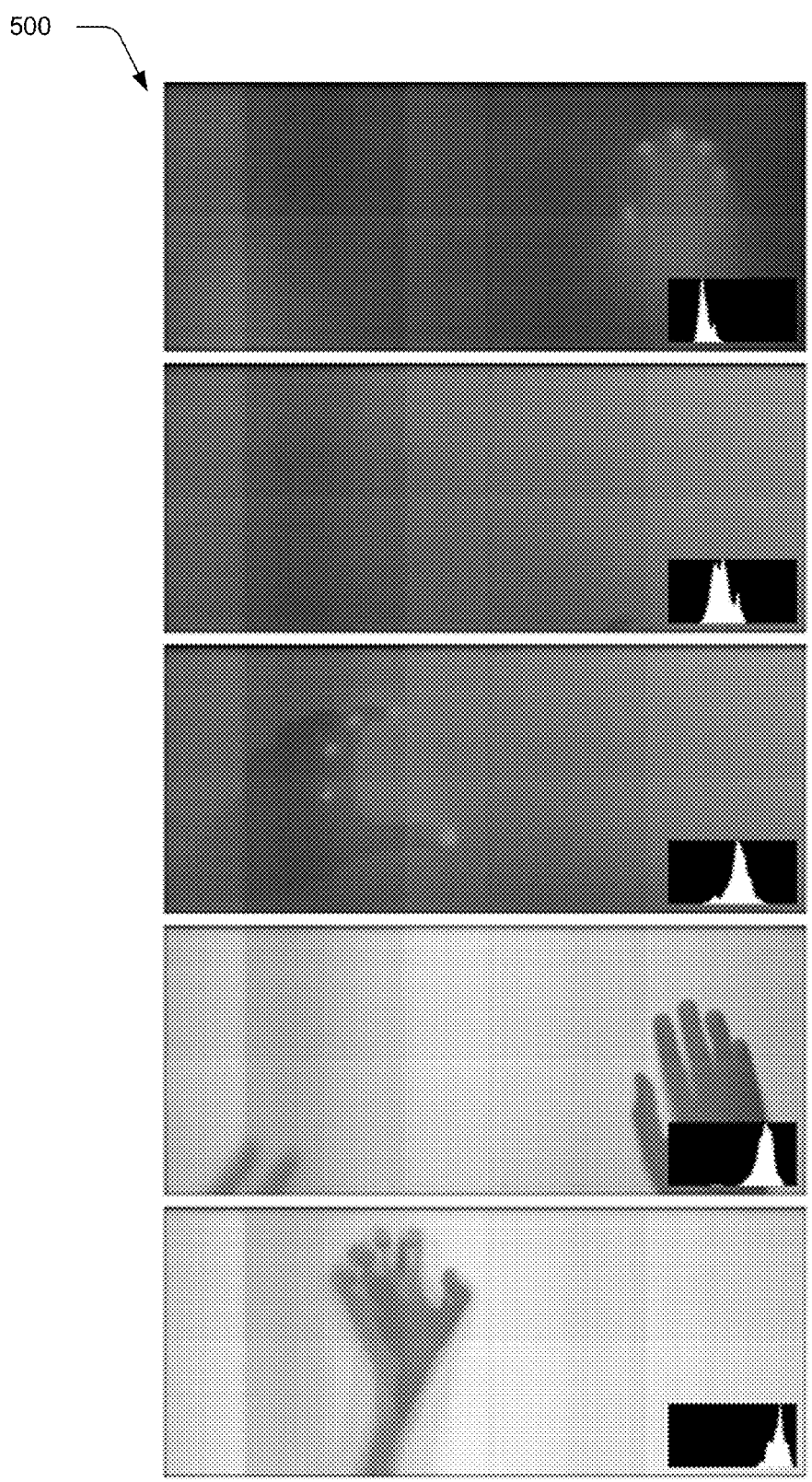
FIG. 5 depicts an example of images that representing a class and the corresponding histograms.

After a class ID has been assigned to each of the training images 414, the class histogram may be recomputed and updated using one or more of the training images 414 that belong to that particular class. This process may be repeated for several iterations until the data partition becomes stable, i.e., the per-class intensity histogram does not exhibit a significant change compared to a version from a previous iteration, to generate pre-trained class histograms 420. FIG. 5 depicts an example 500 of images that representing a class and the corresponding histograms. In the illustrated example 500, the value "K" is set equal to five.

Returning again to FIG. 4, the histogram computation module 410 may be configured to give preference to pixels that are lit by ambient light, alone. Accordingly, in such a configuration the histogram computation module 410 does not utilize each of the pixels in an image to compute a histogram, such as pixels that are involved in touches, shadowed, lit by reflected infrared light emitted by the computing device 102, and so on. This may be performed in a variety of ways.

For example, a box filter (e.g., 35×35) may be applied as a low pass filter to the Field_0 image and the filtered result stored as "Field_0'." Local gradients may be computed as "Field_0_LP=abs(Field_0−Field_0')." If "Field_0_LP(x,y)>T1" then "(x,y)" is a high frequency pixel (e.g., touch or shadow) and is rejected. For pixels that pass the low pass filter, a corresponding value in the "Field_IR" image is checked. The value "(x,y)" is used to compute a histogram if and only if "Field_IR(x,y)<T2." For example, this check may be applied because a large value in "Field_IR" may indicate that the pixel could involve a touch or other object on the display. In one or more implementations, values for "T1" and "T2" are 2 and 3, respectively.

The histogram similarity module 418 may employ a variety of techniques to measure a similarity between two histograms, e.g., the training and seed histograms 412, 416. For example, the distance between two histograms may be defined as the distance between a maximum bin index, e.g., the index of bin [0,255] whose corresponding histogram value is the largest. A smaller distance indicates that the two histograms are more similar than two histograms having a larger distance in this example.

Global Light Detection Estimation

Figure 6:
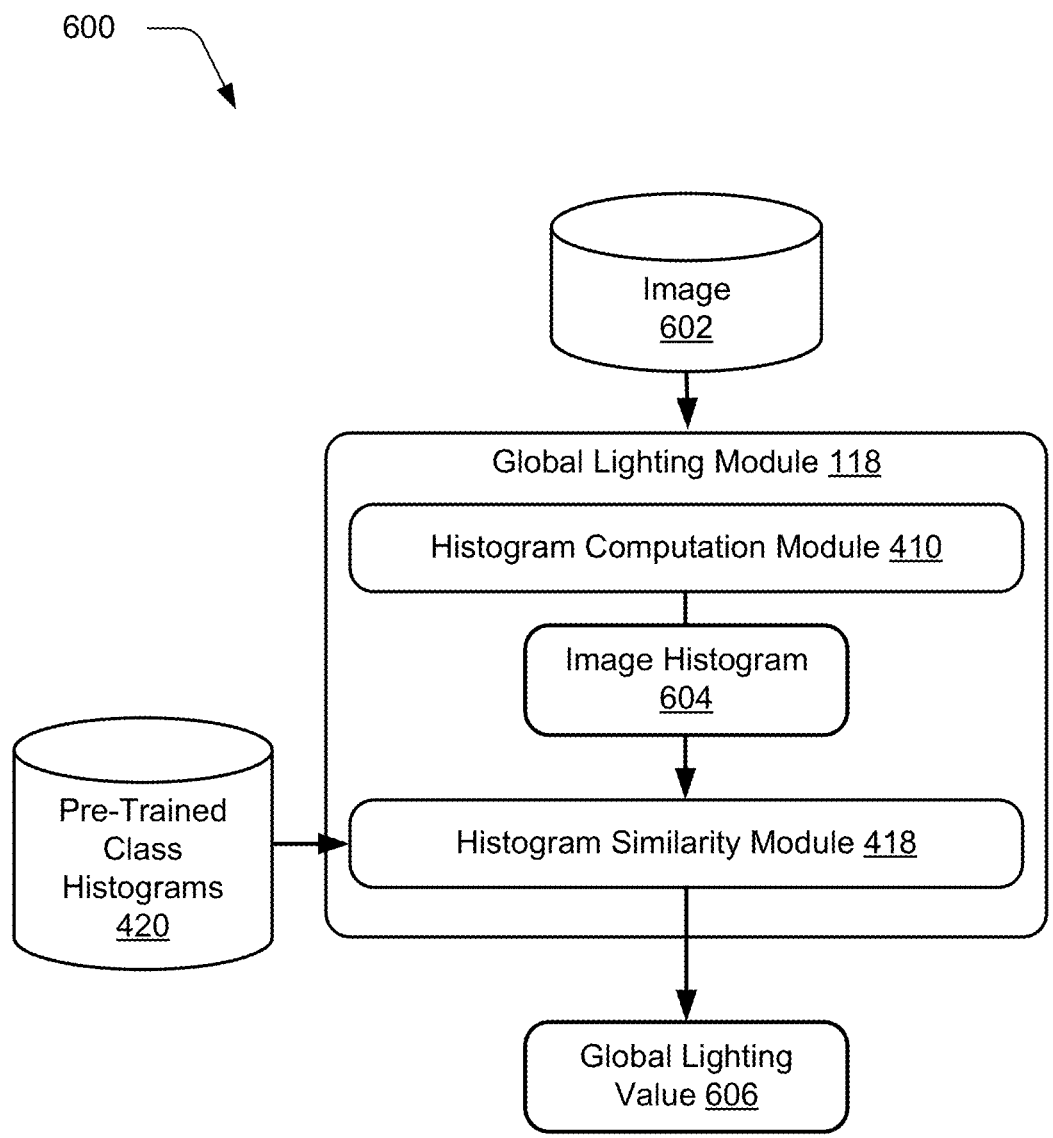
FIG. 6 depicts an example system in which pre-trained class histograms generated by the system of FIG. 4 are utilized to calculate a global lighting value for an image.

FIG. 6 depicts an example system 600 in which pre-trained class histograms 420 generated by the system 400 of FIG. 4 are utilized to calculate a global lighting value for an image. In this example, an image 602 is classified by the global lighting module 118.

The histogram computation module 410, for instance, may be configured to compute an image histogram 604 of an image captured by the optical sensor system 112 of FIG. 1, e.g., a Field_0 image. The image histogram 604 is then compared to the pre-trained class histograms 420 by the histogram similarity module 418 to find a class (e.g., a class ID) that corresponds to the image histogram 604.

The image 602 is then assigned a global lighting value 606 (e.g., an ambient level value) which is the class ID of its nearest neighbor histogram from the pre-trained class histograms 420. The returned global lighting value 606 may then be used to make an adaptive decision, for example to choose the optimum parameters under certain lighting conditions by the object detection module 122, sensor processing module 114, gesture module 110, and so forth.

Local Light Detection Estimation

Figure 7:
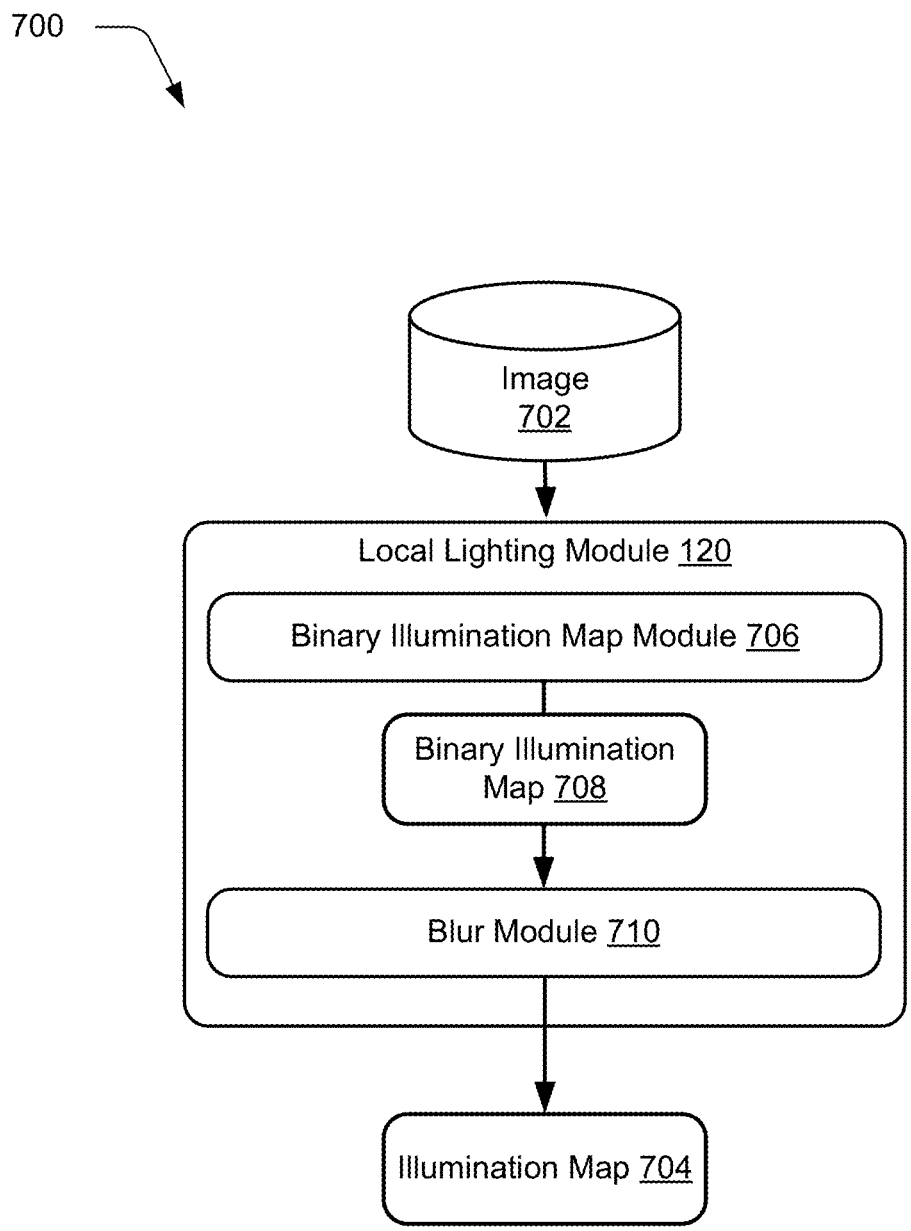
FIG. 7 depicts an example system showing a local lighting module of FIG. 1 in greater detail as configured to generate a local lighting conditions estimation.

FIG. 7 depicts an example system 700 showing the local lighting module 120 of FIG. 1 in greater detail as configured to generate a local lighting conditions estimation. The local lighting module 120 is configured to receive an input image 704 and generates another image configured as an illumination map 704, e.g., where each pixel has a value between "0-255." A value of "0", for instance, indicates that an optical sensor 116 of FIG. 1 corresponding to that pixel location has an extremely dark ambient illumination condition, e.g., it could be in a shadow region or occluded by an object. On the other hand, a value of "255" indicates an extremely strong light, e.g., an overhead lamp at full brightness in the location that corresponds to the respective optical sensor.

These values may then be used to tune algorithmic parameters at a per-pixel level for object detection by the object detection module 112, e.g., so that false touches may be eliminated and suppressed touches end up stronger in the final touch detection stage. The following describes an example of a technique for generating a local illumination value at a pixel that is usable to generate the illumination map 704.

The local lighting module 120 is illustrated as including a binary illumination map module 706. This module, for instance, may accept as an input an image 702 (e.g., a Field_IR image) as described in the preceding section. For each pixel in the image 702, the binary illumination map module 706 selects a portion of neighboring pixels and collects intensity values for those pixels. Thus, portions of values obtained from neighboring ones of a subset of the optical sensors 116 of FIG. 1 may be selected and intensity values collected for the optical sensors 116.

For instance, a Bresenham circle (e.g., of radius 4.5) may be used to select intensity values of neighboring pixels in that circle. For efficiency on a parallel GPU implementation of the computing device 102, the pixel offsets with respect to the center pixel for identifying neighbors falling on the Bresenham circle may be stored in a look-up table that is loaded just once. The Bresenham circle in this case includes 96 neighboring pixels although other examples are also contemplated.

The binary illumination map module 706 then measures an arc-length on the Bresenham circle, such that each of the pixels on the arc are brighter than a center pixel by at-least a predefined number of gray values, e.g., ten. Also, the binary illumination map module 706 also records the intensity value of the center pixel and the variance of pixel intensities in a predefined portion (e.g., a 9×9 square block) about the center pixel. This step may be performed concurrently while measuring the arc length by the binary illumination map module 706.

The recordation of the intensity values as described above may be used to generate hard constraints for a local illumination map. If there are at least 10 pixels continuously brighter than the center pixel (as computed by measuring the arc-length), then the center pixel is given a value of 255. The logic here is that in the event of a touch down, the local intensity distribution about the center pixel is to have at least a predefined smoothness, irrespective of lighting, and thus does not generate such a well oriented intensity gradient. This arc may be caused by shadows (see FIGS. 8-10) when an object (e.g., a finger) is hovering on top of a SIP panel or other configuration of an optical sensor system 112.

The hard constraints may therefore be leveraged as a check before assigning the pixel a value of "0," i.e., this pixel is under a touch down event caused by an object, if it fails the arc test. If the center pixel is not brighter than an intensity value of "128" (which is half the max possible gray level and assuming that a touchdown cannot be brighter than this under any lighting condition) and the block of 9×9 pixel intensities around yields a variance of "25," i.e., the neighborhood is smooth and dark, then this pixel is assigned a value of "0."

The binary illumination map 708 is then processed by a blur module 710. The blur module 710, for instance, may apply a blur kernel (e.g., 9×9) to yield the final illumination map 704. The illumination map 704 output by the local lighting module 120, along with the global lighting value 606 output by the global lighting module 118 may then be utilized to perform object detection along with images captured by the optical sensors 116 of the optical sensor system 112. For a sensor-in-pixel configuration, for instance, the object detection module 122 may determine a likelihood for each pixel in an image captured by the optical sensors 116 that an object has been detected by that pixel. This may be utilized to support a variety of functionality as previously described, such as to support use of gestures recognized by the gesture module 110 of FIG. 1.

Figure 8:
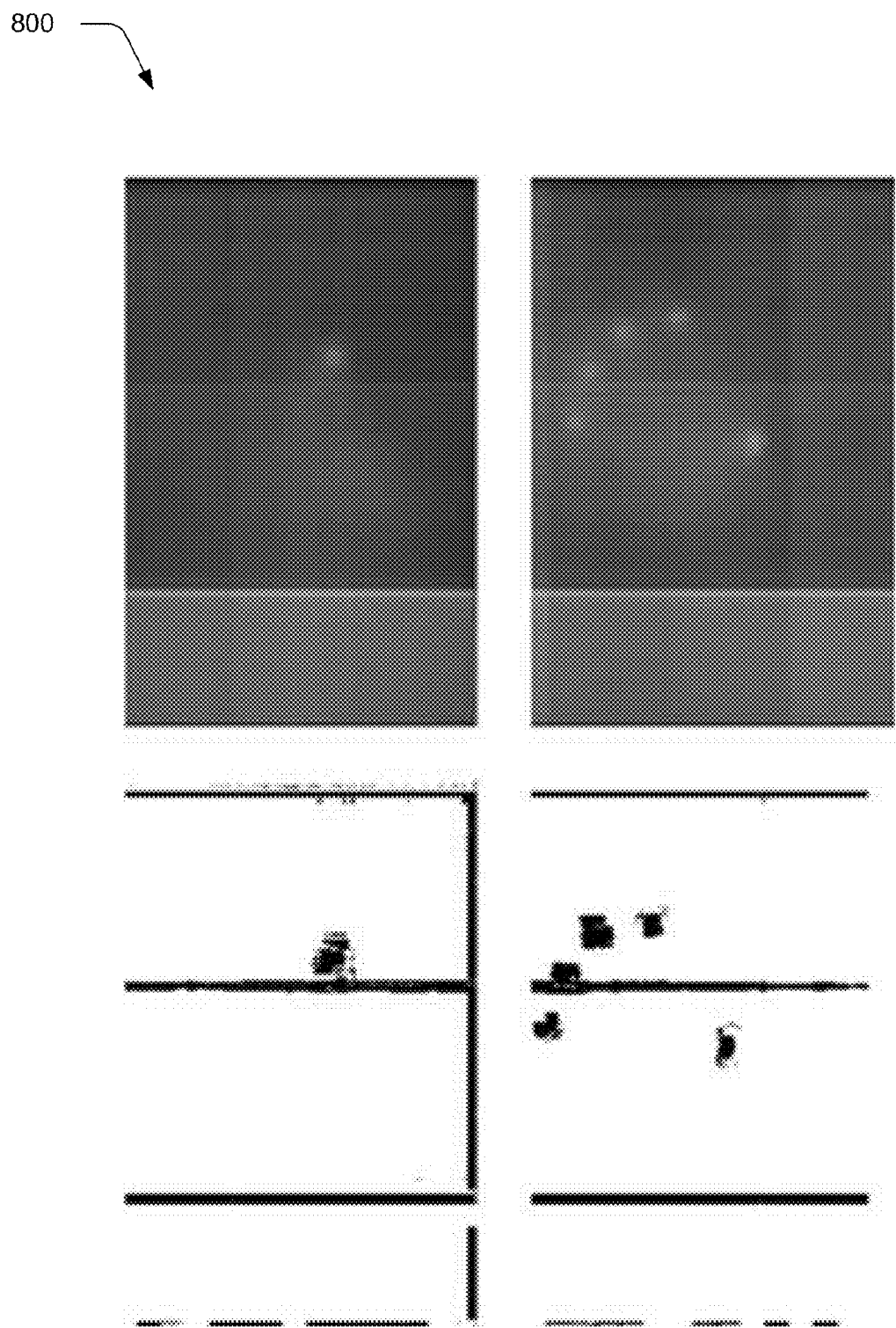
FIG. 8 depicts an example implementation showing an example of object detection involving touch down events of fingers of a user's hand.

FIG. 8 depicts an example implementation 800 showing an example of object detection involving touch down events of fingers of a user's hand 108. In the top row, input images (Field_0) of touch-down events on a SIP panel under low light are shown. The bottom row illustrates examples of corresponding output local illumination maps, where dark pixels are detected touch downs, and bright regions are "ambient".

The illustrated horizontal lines are due to artifacts in the panel which is also seen in the input images and thus are ignored by the module. As shown, the images illustrate that under low light conditions, the sensor processing module 114 allows "correct" touches to go through and therefore does not introduce false negatives.

Figure 9:
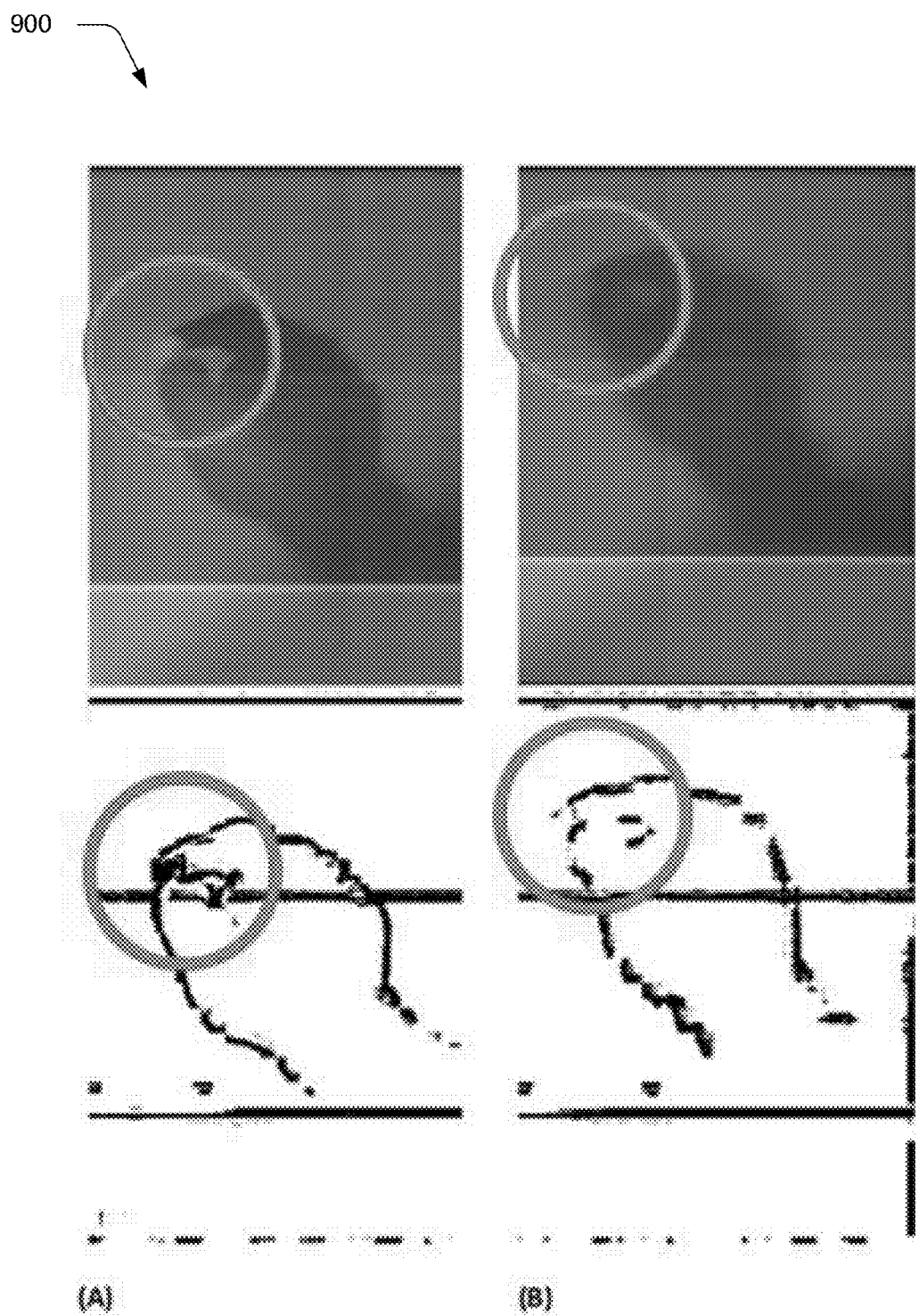
FIG. 9 depicts an example of detection of a touch down event initiated by an object that is followed by a touch up event in relatively low ambient lighting conditions.

FIG. 9 depicts an example 900 of detection of a touch down event initiated by an object that is followed by a touch up event in relatively low lighting conditions. The object in this example is a finger of a user's hand. In the illumination map in column (A), fingertip pixels are dark during the touch down event. On a touch up in column (B), the pixels changes to bright under the fingertip in the illumination map. The dark edges of the contour of the hand itself may be rejected by the object detection module 112 and thus do not interfere with the object detection.

Figure 10:
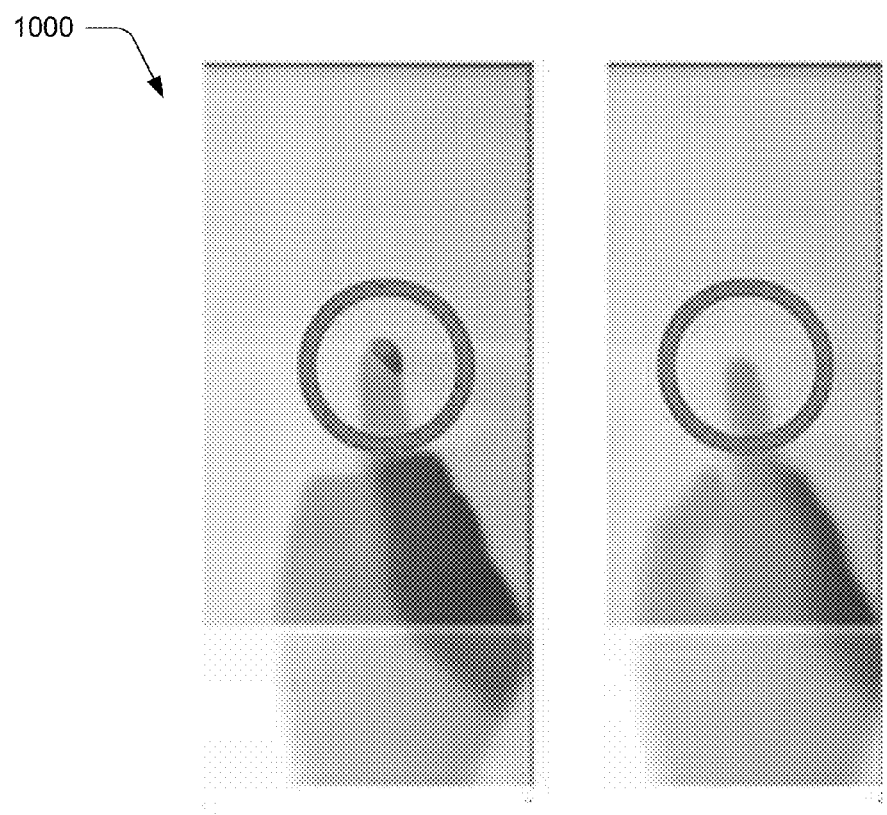
FIG. 10 depicts an example of detection of a touch down event initiated by an object that is followed by a touch up event in relatively high ambient lighting conditions.
Figure 10:
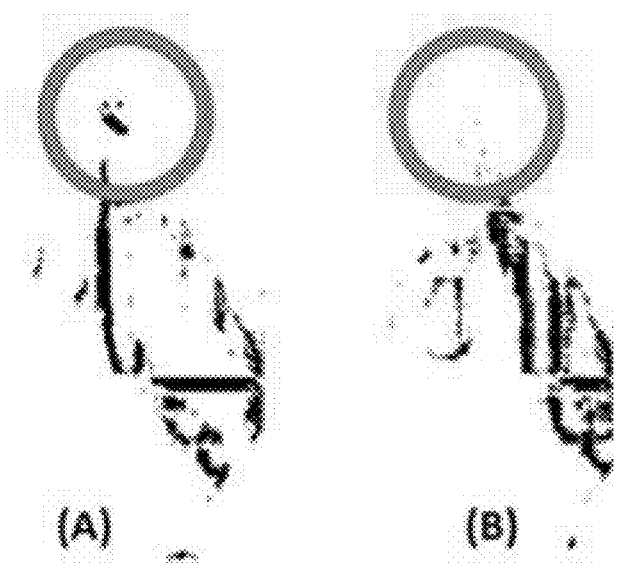

FIG. 10 depicts an example 1000 of detection of a touch down event initiated by an object that is followed by a touch up event in relatively high ambient lighting conditions. The object in this example is also a finger of a user's hand. In the illumination map in column (A), fingertip pixels are dark during the touch down event as in the previous example shown in FIG. 9. Also, on a touch up in column (B), the pixels changes to bright under the fingertip in the illumination map. Thus, even in bright ambient lighting conditions the object detection module 112 may detect object which may be utilized to support gestures and other functionality.

Example Procedures

The following discussion describes global and local light detection and object detection techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 11:
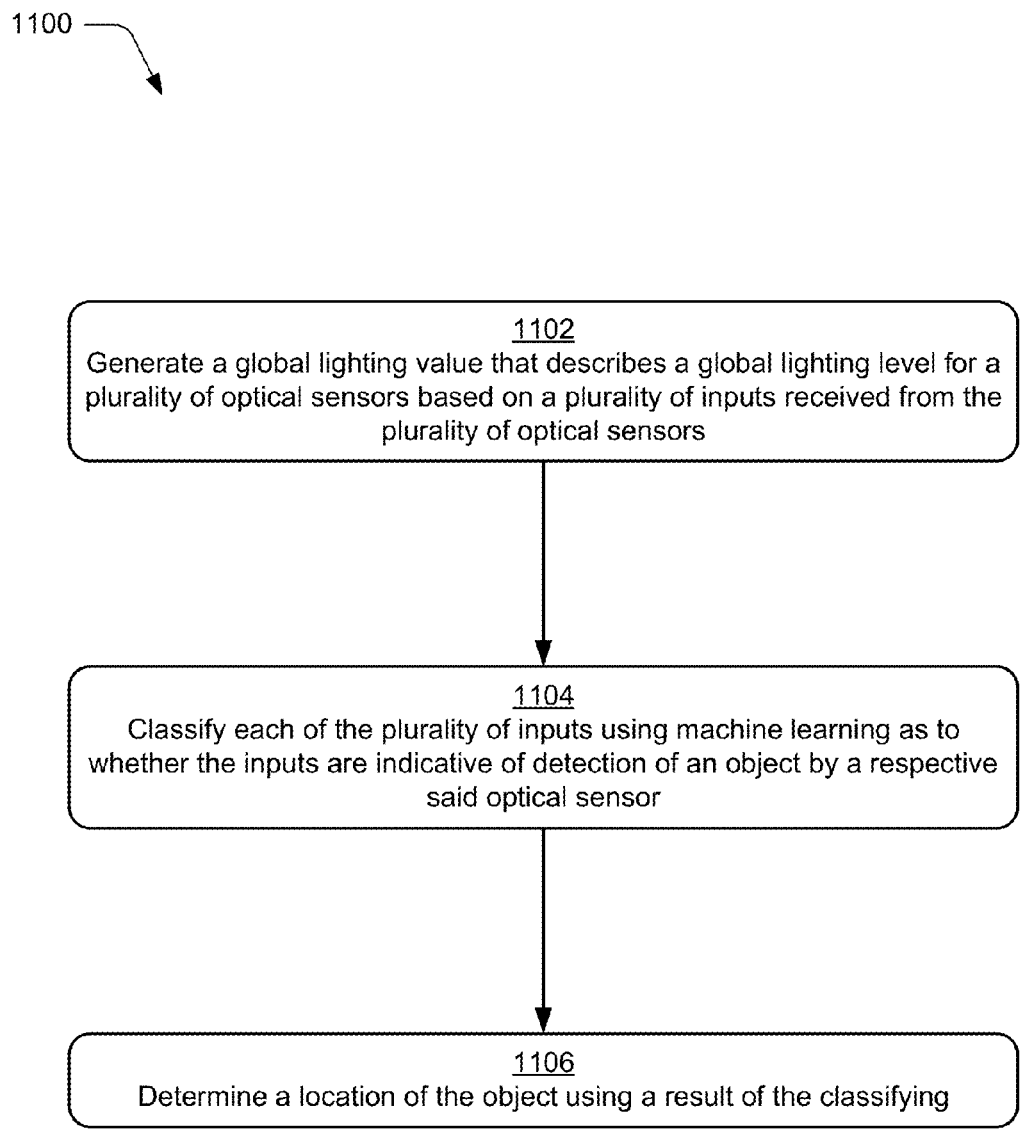
FIG. 11 is a flow diagram depicting a procedure in an example implementation in which global and local light values are utilized as part of object detection by an optical sensor system.

FIG. 11 depicts a procedure 1100 in an example implementation in which global and local light values are utilized as part of object detection by an optical sensor system. A global lighting value is generated that describes a global lighting level for a plurality of optical sensors based on a plurality of inputs received from the plurality of optical sensors (block 1102). A global lighting module 118, for instance, may generate a histogram from an image captured by optical sensors 116 of an optical sensor system 112. This histogram may be compared with pre-trained class histograms 420 to locate a class and corresponding class ID. The class ID may be utilized as the global lighting value for that image as shown and described in relation to FIG. 6.

An illumination map is also generated that describes local lighting conditions of respective ones of the plurality of optical sensors based on the plurality of inputs received from the plurality of optical sensors (block 1104). The local lighting module 120, for instance, may utilize a binary illumination map module 706 and a blur module 710 to generate an illumination map that describes illumination at a localized subset of the optical sensors 112, e.g., in a sensor-in-pixel or other configuration.

Object detection is performed using the image captured using the plurality of optical sensors along with the global lighting value and the illumination map (block 1106). Continuing with the previous example, the object detection module 122 may utilize an image, which may be the same as or different from the images utilized to generate the global lighting value and the illumination map, along with the global lighting value and illumination map to answer a per-sensor question of "does this optical sensor detect an object?" This may be utilized to support a variety of functionality such as gestures, object identification, facial recognition, and so on.

Figure 12:
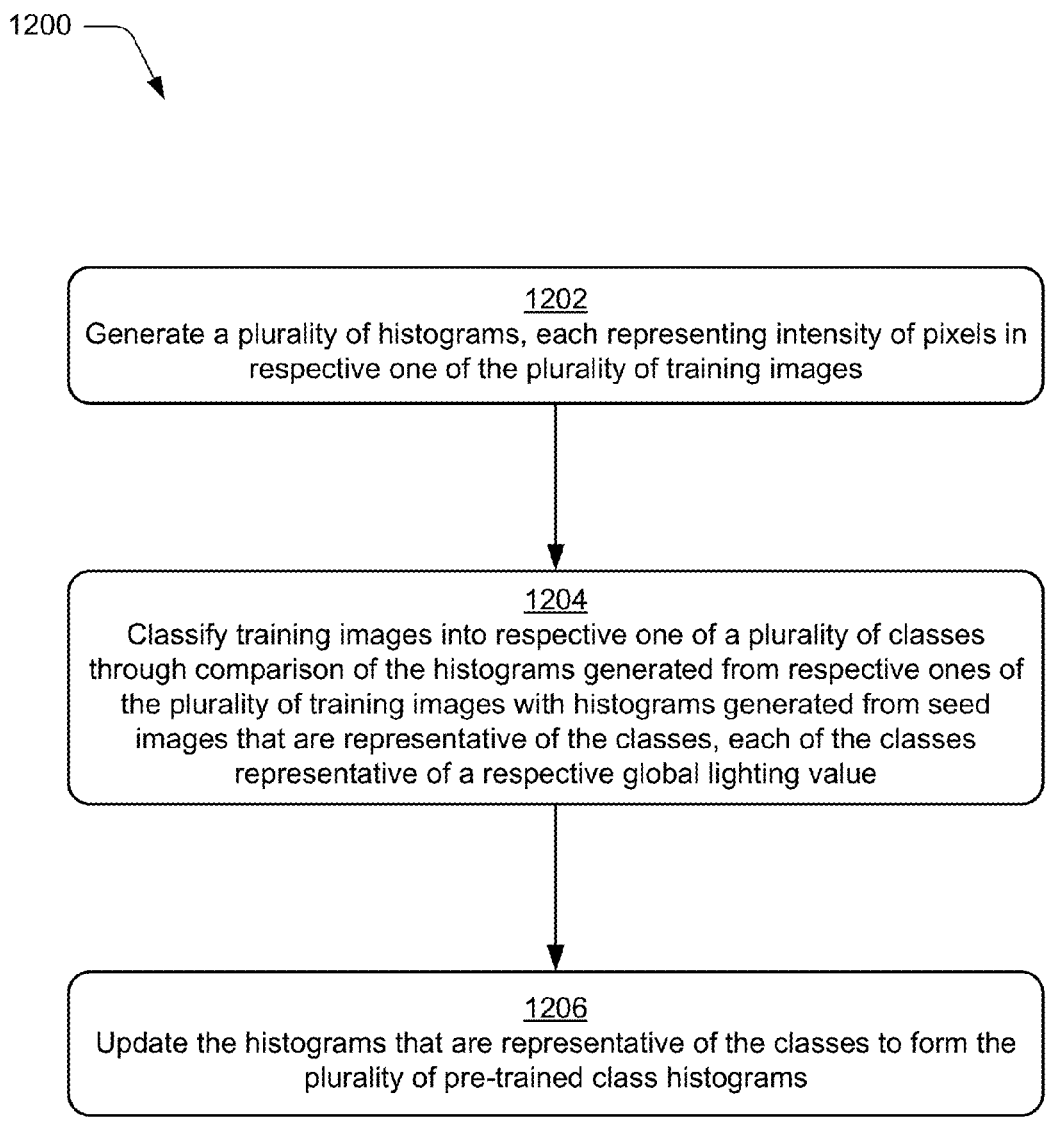
FIG. 12 is a flow diagram depicting a procedure in an example implementation in which pre-trained class histograms are trained.

FIG. 12 depicts a procedure 1200 in an example implementation in which pre-trained class histograms are trained. A plurality of pre-trained class histograms are trained that are usable to detect a global lighting value through comparison with a histogram generated from inputs received from a plurality of optical sensors of an optical sensor system. As described in relation to FIG. 54, the global lighting module 118 may be utilized to train pre-trained class histograms 420 that are usable to identify respective classes as previously described in relation to FIG. 11.

The training includes generating a plurality of histograms, each representing intensity of pixels in respective one of the plurality of training images (block 1202). A histogram computation module 410, for instance, may be utilized to generate the training histograms.

The training also includes classifying training images into respective one of a plurality of classes through comparison of the histograms generated from respective ones of the plurality of training images with histograms generated from seed images that are representative of the classes, each of the classes representative of a respective global lighting value (block 1204). A histogram similarity module 418, for instance, may compare the training histograms 416 with the seed histograms 412 to determine which histograms, and consequently which class, is most similar.

The training further includes updating the histograms that are representative of the classes to form the plurality of pre-trained class histograms (block 1206). As previously described, this process may be iterative and thus classified training histograms 416 may be utilized to update the histogram that is representative of a respective class. A variety of other examples are also contemplated without departing from the spirit and scope thereof.

Example System and Device

Figure 13:
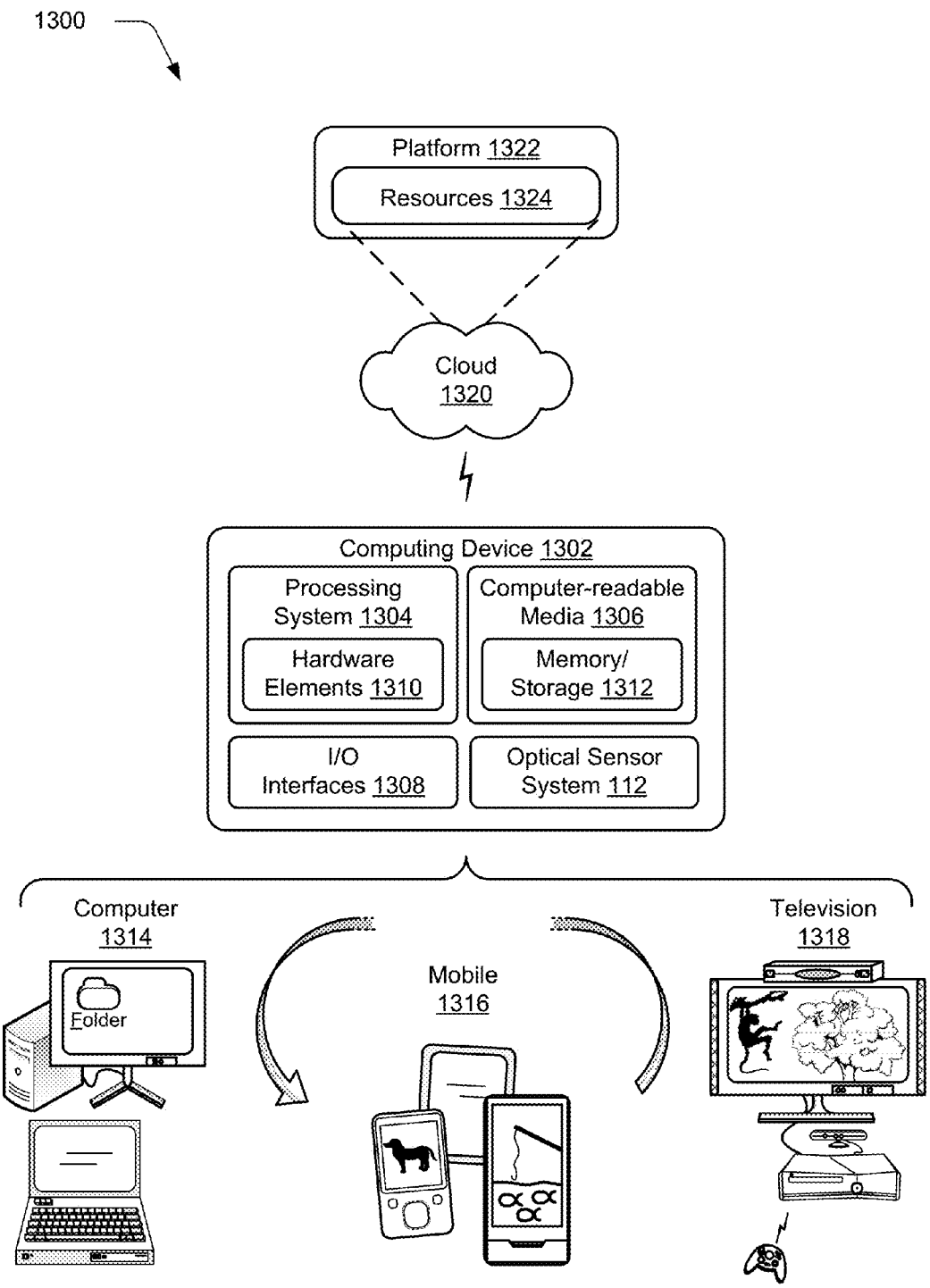
FIG. 13 illustrates various components of an example device that can be implemented as any type of portable and/or computer device as described with reference to FIGS. 1-12 to implement embodiments of the object detection techniques described herein.

FIG. 13 illustrates an example system generally at 1300 that includes an example computing device 1302 that is representative of one or more computing systems and/or devices that may implement the various techniques described herein. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, portable music player, portable gaming device, a tablet computer, a multi-screen computer, and so on. The computing device 1302 may also be implemented as the television 1318 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. This functionality may also be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout the system 1300. For example, the functionality may be implemented in part on the computing device 1302 as well as via the platform 1322 that abstracts the functionality of the cloud 1320.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
generating a global lighting value that describes a global lighting level for a plurality of optical sensors based on a plurality of inputs received from the plurality of optical sensors, the global lighting value determined based on a comparison of a histogram indicating pixel intensity in the image to pre-trained histograms, each of the pre-trained histograms representative of a class indicative of a respective global lighting value;
generating an illumination map that describes local lighting conditions of respective ones of the plurality of optical sensors based on the plurality of inputs received from the plurality of optical sensors; and
performing object detection using an image captured using the plurality of optical sensors along with the global lighting value and the illumination map.

2. A method as described in claim 1, further comprising recognizing a gesture as a result of the performing, the gesture usable to initiate one or more functions of a computing device that is configured to perform the generating of the global lighting value, the generating of the illumination map, and the performing of the object detection.

3. A method as described in claim 1, further comprising calculating the plurality of pre-trained histograms by assigning histograms of a plurality of training images to respective said classes.

4. A method as described in claim 3, wherein the respective said classes are specified by a user.

5. A method as described in claim 3, wherein the respective said classes are specified automatically and without user intervention.

6. A method as described in claim 1, wherein the generating of the illumination map includes selecting portion of values obtained from neighboring ones of a subset of the optical sensors and collecting intensity values for the sensors.

7. A method as described in claim 6, wherein the portion is defined using a Bresenham circle.

8. A method as described in claim 6, wherein the generating of the illumination map includes measuring an arc-length using the portions such that each of the values of the optical sensors on the arc are brighter than a value of an optical sensor at a center of the portion.

9. A method as described in claim 1, wherein the generating of the illumination map includes use of a blur kernel.

10. A method as described in claim 1, wherein the plurality of optical sensors are configured in accordance with a sensor-in-pixel configuration of a display device of a computing device.

11. A system comprising:
a plurality of optical sensors; and
modules implemented at least partially in hardware, the one or more modules configured to implement:
a global lighting module configured to generate a global lighting value that describes a global lighting level for the plurality of optical sensors based on a plurality of inputs received from the plurality of optical sensors, the global lighting value generated by comparing a histogram indicating intensity of pixels in the image to a plurality of pre-trained histograms of intensity corresponding to different global lighting values;
a local lighting module configured to generate an illumination map that describes local lighting conditions of respective ones of the plurality of optical sensors based on the plurality of inputs received from the plurality of optical sensors; and
an object detection module configured to perform object detection using an image captured using the plurality of optical sensors along with the global lighting value and the illumination map.

12. A system as described in claim 11, further comprising a gesture module configured to recognize a gesture as a result of the performance of the object detection.

13. A system as described in claim 11, wherein the local lighting module is configured to generate the illumination map at least in part by selecting a portion of values obtained from neighboring ones of a subset of the optical sensors and collecting intensity values for the sensors.

14. A system as described in claim 13, wherein the generating of the illumination map includes measuring an arc-length using the portions such that each of the values of the optical sensors on the arc are brighter than a value of an optical sensor at a center of the portion.

15. A system as described in claim 11, wherein the generating of the illumination map includes use of a blur kernel.

16. A computing device comprising;
a processing system; and
one or more computer readable storage media comprising instructions that, when executed by the processing system, cause the computing device to perform operations for object detection including:
generating a global lighting value that describes a global lighting level for a plurality of optical sensors based on a plurality of inputs received from the plurality of optical sensors, the global lighting value determined based on a comparison of a histogram indicating pixel intensity in the image to pre-trained histograms of intensity corresponding to different global lighting values;
generating an illumination map that describes local lighting conditions of respective ones of the plurality of optical sensors based on the plurality of inputs received from the plurality of optical sensors; and
performing object detection using an image captured using the plurality of optical sensors along with the global lighting value and the illumination map.

17. A computing device as described in claim 16, wherein the instructions, when executed by the processing system, further cause the computing device to perform operations including: recognizing a gesture as a result of the performing, the gesture usable to initiate one or more functions of the computing device.

18. A computing device as described in claim 16, wherein the generating of the illumination map includes selecting portion of values obtained from neighboring ones of a subset of the optical sensors and collecting intensity values for the sensors.

19. A computing device as described in claim 18, wherein the portion is defined using a Bresenham circle.

20. A computing device as described in claim 18, wherein the generating of the illumination map includes measuring an arc-length using the portions such that each of the values of the optical sensors on the arc are brighter than a value of an optical sensor at a center of the portion.

* * * * *